United States Patent
Mossoba et al.

(10) Patent No.: US 11,853,524 B2
(45) Date of Patent: Dec. 26, 2023

(54) AUGMENTED REALITY EXTENDED VIEW

(71) Applicant: Capital One Services, LLC, McLean, VA (US)

(72) Inventors: Michael Mossoba, Great Falls, VA (US); Jerry Wagner, Chesterfield, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/711,474

(22) Filed: Apr. 1, 2022

(65) Prior Publication Data
US 2023/0315243 A1 Oct. 5, 2023

(51) Int. Cl.
| | |
|---|---|
| *G06F 3/0481* | (2022.01) |
| *G06F 16/957* | (2019.01) |
| *G02B 27/01* | (2006.01) |
| *G06F 16/958* | (2019.01) |

(52) U.S. Cl.
CPC ......... *G06F 3/0481* (2013.01); *G02B 27/017* (2013.01); *G06F 16/958* (2019.01); *G06F 16/9574* (2019.01); *G06F 16/9577* (2019.01)

(58) Field of Classification Search
None
See application file for complete search history.

(56) References Cited

U.S. PATENT DOCUMENTS

| | | | | |
|---|---|---|---|---|
| 10,296,897 B1* | 5/2019 | Wu | ...................... | G06Q 20/351 |
| 11,601,719 B2* | 3/2023 | Gao | ...................... | G06F 3/1454 |
| 2002/0046109 A1 | 4/2002 | Leonard et al. | | |
| 2008/0184159 A1* | 7/2008 | Selig | ...................... | G06F 40/174 |
| | | | | 715/781 |
| 2010/0199169 A1 | 8/2010 | Gnech et al. | | |
| 2011/0126093 A1* | 5/2011 | Ozzie | ...................... | G06F 3/048 |
| | | | | 715/256 |
| 2011/0258175 A1* | 10/2011 | Kim | ...................... | G06F 16/951 |
| | | | | 707/E17.108 |
| 2012/0311456 A1* | 12/2012 | Davar | ...................... | H04L 67/63 |
| | | | | 715/738 |
| 2013/0298076 A1* | 11/2013 | Rice | ...................... | G06F 3/0481 |
| | | | | 715/781 |
| 2014/0337634 A1* | 11/2014 | Starner | ................. | H04W 12/33 |
| | | | | 713/186 |
| 2015/0243258 A1* | 8/2015 | Howe | .................. | G06T 11/001 |
| | | | | 345/629 |
| 2016/0212123 A1 | 7/2016 | Koster | | |
| 2016/0232144 A1* | 8/2016 | Zhou | ...................... | G06F 40/169 |
| 2016/0291808 A1 | 10/2016 | Wang et al. | | |
| 2017/0132624 A1* | 5/2017 | Muchang | .............. | G06F 40/174 |

(Continued)

*Primary Examiner* — Tuyetlien T Tran
(74) *Attorney, Agent, or Firm* — Perkins Coie LLP (57) ABSTRACT

Disclosed embodiments include systems, devices, and methods for extending a view of an interface by way of augmented reality glasses. Web page content can be identified for presentation outside the purview of a web browser. The content can be saved to a network-accessible store. Subsequently, a request is sent, including the location of the network-accessible store, to augmented reality glasses. The content can be acquired from the location by the augmented reality glasses. Subsequently, the content can be rendered by the augmented reality glasses in a manner that extends the view beyond the web browser and physical display.

18 Claims, 8 Drawing Sheets

(56) References Cited

U.S. PATENT DOCUMENTS

| | | | |
|---|---|---|---|
| 2017/0177171 A1* | 6/2017 | Won | G06F 3/04883 |
| 2018/0020203 A1* | 1/2018 | Miura | H04N 13/383 |
| 2018/0047018 A1* | 2/2018 | De Ganon | G06Q 20/102 |
| 2018/0278462 A1* | 9/2018 | Bjontegard | H04L 41/044 |
| 2018/0300771 A1* | 10/2018 | Roger | G06Q 30/0277 |
| 2018/0335998 A1* | 11/2018 | Callaghan | H04L 67/1095 |
| 2019/0339834 A1* | 11/2019 | Weiner | G06F 40/14 |
| 2020/0276707 A1 | 9/2020 | Go et al. | |
| 2020/0293178 A1* | 9/2020 | Kumar | G06F 3/013 |
| 2021/0110462 A1 | 4/2021 | Yee et al. | |
| 2021/0209588 A1 | 7/2021 | de Ganon et al. | |
| 2021/0272115 A1 | 9/2021 | Muchang et al. | |
| 2022/0318791 A1* | 10/2022 | Ballenger | G06F 9/44526 |

\* cited by examiner

AUGMENTED REALITY EXTENDED VIEW

BACKGROUND

A web browser is a program that can allow a user to explore the World Wide Web or simply the web. For example, a user can employ a web browser to request a web page from a website. In response, the web browser acquires content from a web server and presents the content within a web browser window, which is rendered on a display of a computing device. Web browsers can provide several additional features, such as tabs that allow multiple web pages to be open simultaneously. Tabs enable navigation between currently displayed and hidden web pages. Selection of a tab activates display of a web page associated with that tab.

SUMMARY

The following presents a simplified summary to provide a basic understanding of some aspects of the disclosed subject matter. This summary is not an extensive overview. It is not intended to identify necessary elements or to delineate the scope of the claimed subject matter. Rather, this summary presents some concepts in a simplified form as a prelude to the more detailed description presented later.

Briefly described, disclosed embodiments may relate to an augmented reality extended view. A web browser can include functionality that extends the display of web content beyond a browser window and the confines of a physical display device. The web browser can request content presentation by an augmented reality device, such as augmented reality glasses, through wireless communication or code display. Further, the web browser can provide content for display by the augmented reality device at a network-accessible location communicated with the request. Additional information specifying the position of the content can also be provided at the network-accessible location, among other things. The augmented reality device can acquire the content and position information from the location and project the content at the position specified within an extended view overlaid and centered on the browser. The augmented reality extended view provides an immersive experience in which content is superimposed onto the real-world environment and outside the purview of a web browser and display device. In one instance, the content presented in the extended view can be copied and subsequently pasted within a web browser window. Further, content presentation in the extended view can be discontinued in response to events such as closing a browser window or tab or a user request, among other things.

According to one aspect, disclosed embodiments may include a system that comprises a processor coupled to a memory that includes instructions that, when executed by the processor, cause the processor to identify content associated with a webpage being displayed on a web browser for presentation outside a purview of the web browser, save the content to network-accessible storage, and generate a request, including a location of the network-accessible storage, to an augmented reality device to present the content in an extended view overlaid on the web browser. The instructions can further cause the processor to identify content associated with a web browser extension that generates a virtual payment card or identifies a deal on a product or service during online shopping. In one instance, the instructions can further cause the processor to generate a visible code and display the visible code on a webpage of the web browser to send the request. The instructions can cause the processor to initiate wireless communication with the augmented reality device in another instance. Further, the instructions can cause the processor to set a flag to continue presentation of content in the extended view or discontinue the presentation of the context in the extended view. The instructions can also cause the processor to detect the closing of a web browser and set a flag to discontinue the presentation of the content in the extended view. Furthermore, the instructions can cause the processor to acquire data copied from the extended view and save the data on a clipboard to enable the data to be pasted on a web page in the web browser. In one instance, the instructions can further cause the processor to save the display position of the content in the extended view at the location.

According to another aspect, disclosed embodiments may include a method comprising identifying content associated with a webpage being displayed on a web browser for presentation outside a purview of a web browser, saving the content to a network-accessible data store, and generating a request, including a location of the network-accessible data store, to an augmented reality device to present the content in an extended view overlaid on the web browser. The method can further comprise identifying non-displayed web page content for presentation outside the purview of the web browser. The method can also comprise identifying web page content generated by a web browser extension that generates a virtual payment card or identifying web page content generated by an online shopping browser extension. Further, the method can comprise setting a flag to discontinue presenting the content in the extended view. The method can also comprise generating and displaying a visible code on a web page of the web browser to send the request.

Per another aspect, disclosed embodiments may include a method comprising identifying a request associated with content being displayed on a web browser, accessing a network-accessible data store specified with the request, acquiring content from the network-accessible data store, and rendering the content in an augmented reality view that extends beyond physical boundaries of a display device that displays the web browser. The method further comprises acquiring a position from the network-accessible data store and rendering the content at the position in the augmented reality view. Further, the method comprises copying at least a portion of the content and transmitting the at least a portion of the content to a computing device for pasting within the web browser. The method also comprises checking the flag specified on the network-accessible data store and discontinuing the rendering when the content when the flag is set.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Displays of web content are typically confined to a web browser window, limited by the constraints of the browser's graphical user interface, as well as the physical display device (e.g., a monitor) on which the browser is displayed. For example, content can be acquired from a web server and displayed by a browser rendering engine in a browser window. In many instances, all content is not wholly visible within the browser window as the content size can exceed the presentation space. Consequently, browsers provide horizontal and vertical scrolling to access all content within the window. Further, web browsers have introduced tabs to allow multiple documents or panels to be contained within a single window. However, there can be only one visible, active panel, and scrolling may still be required to view all content in the panel. Moreover, the physical space allotted for displaying the web browser can be limited by the hardware associated with the computing device. For example, a portable device, such as a small laptop or smartphone, may have a smaller display than a desktop computer display.

In addition to conventional web content, web browser extensions can provide additional content for display. For example, an online shopping extension can search for promotional codes, deals, and the lowest price on a product or service. In another instance, an extension can generate virtual payment cards to purchase products. Web browser content can be re-rendered to include extension content. The extension content can be overlaid on original browser content in a window, or a new tab that includes the extension content can be opened.

It can be difficult and inconvenient to access particular content within the purview of a web browser. Accessing content of interest can entail activating particular tabs and scrolling through content. In some instances, content can be distributed across tabs causing a user to cycle through activation and deactivation of tabs. Further yet, the view of content within a web browser window is constrained by the physical dimensions of a display associated with a computing device. For example, a small display may necessitate more scrolling, as well as zooming in and out, to access content than a larger display.

Disclosed embodiments may provide an extended augmented reality view of web-based content. A web browser can request that content be presented on augmented reality glasses. The request can include content as well as position data. The content can include a web page, image, video, animation, code, or a combination. In one instance, the request, content, and position data can be wirelessly communicated directly to paired augmented reality glasses. Alternatively, the request can include a network address, and the address can be accessed to acquire the content and position data, among other things. After content and position data are acquired, the augmented reality glasses can project the content at the position specified within an extended view overlaid and centered on the browser. In one instance, the content presented in the extended view can be copied and transmitted to the browser, for example, to fill in payment fields. After a specified time or in response to the closing of a browser or user request, the augmented reality glasses can terminate the display of the content.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
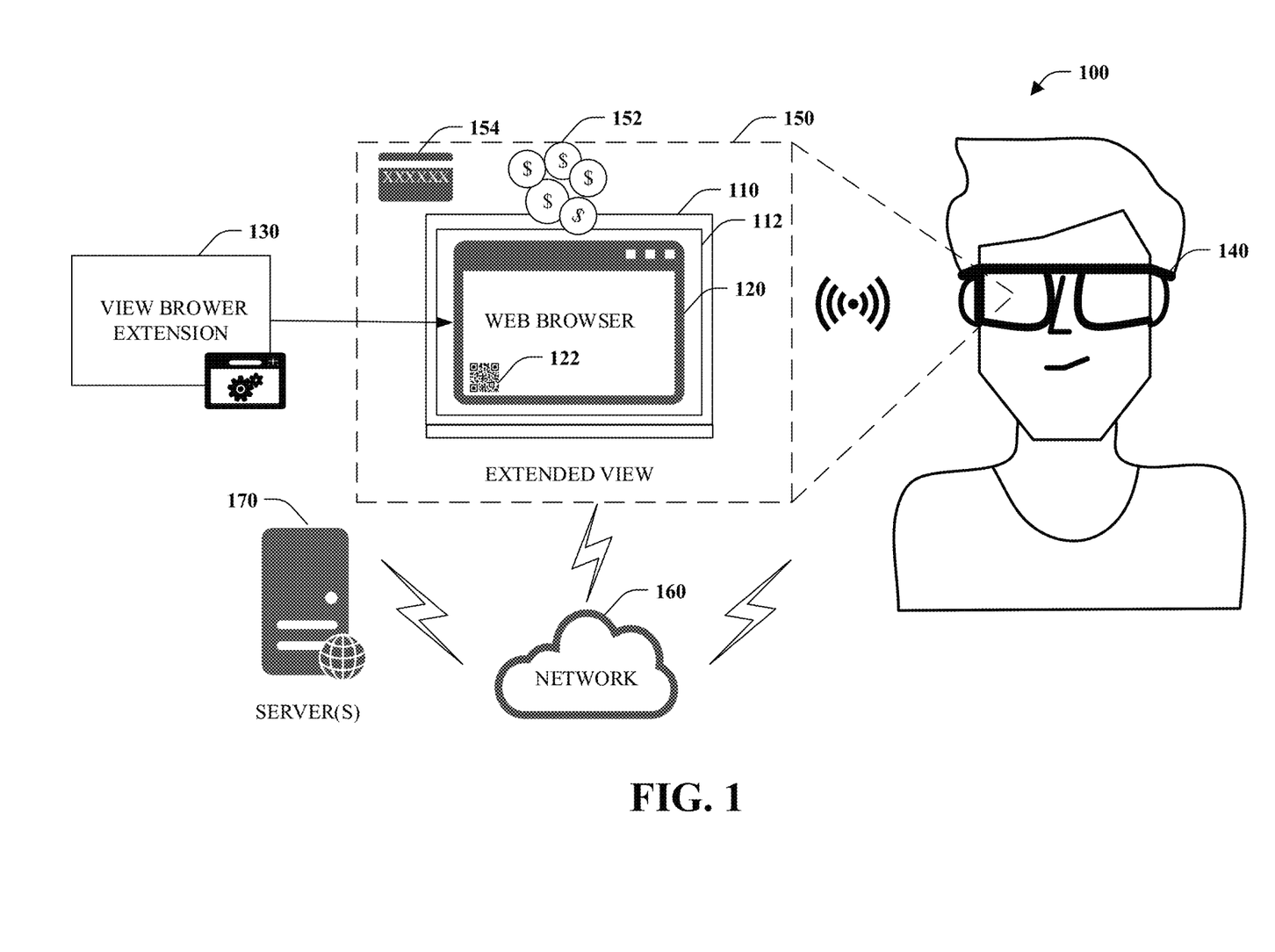
FIG. 1 illustrates an overview of an example implementation.

Referring initially to FIG. 1, a high-level overview of an example implementation 100 is depicted. The implementation 100 may include a computing device 110, display 112, web browser 120, a view browser extension 130, augmented reality (AR) glasses 140, extended view 150, network 160, and servers 170.

The computing device 110 may include any processor-based device with a display 112, as described in further detail later. As shown, the computing device 110 is a laptop computer. However, the computing device 110 could also be a desktop computer, tablet, or smartphone, among other things. Further, the computing device can support wireless communication, including a wireless personal area network (WPAN), wireless local area networks (WLAN), wireless wide area network (WWAN), and cellular network or mobile network.

As shown in FIG. 1, the web browser 120 is currently being presented on the display 112. The web browser 120 may be an application executed on the computing device 110 for retrieving, presenting, and traversing an information resource on the web. An information resource can be a web page, image, video, or other content identified by a uniform resource locator (URL) or web address. Furthermore, the web browser 120 can support browser extensions for customizing a web browser. Extensions can modify a user interface, block ads, manage cookies, as well as provide custom scripting for web pages. For example, an online shopping extension can provide promotional codes and identify the lowest price for a product or service. As another example, an extension can support the generation and use of virtual payment cards.

The view browser extension 130 is a browser extension that enables an extended view 150 beyond the purview of the web browser and physical dimensions of the display 112. In one instance, the view browser extension 130 can operate with respect to other browser extensions or be integrated within the browser extensions themselves. However, the view browser extension 130 can operate with respect to conventional web information resources, such as non-customized web pages.

The view browser extension 130 can identify information resources for presentation in the extended view 150. The resources can be stored at a location on a network-accessible server. Additionally, the view browser extension 130 can include position information regarding where in the extended view 150 the information resource should be located. Other information such as the time the resource should be presented or removed can also be included.

Further, the view browser extension 130 can request the resources be presented by the augmented reality glasses 140. In one instance, the request, location of one or more resources, and other information can be communicated wirelessly from the computing device 110 to the augmented reality glasses 140. For example, Bluetooth communication can be employed between the computing device 110 and the augmented reality glasses 140. The web browser can display a code 122 the augmented reality glasses 140 can read in another embodiment. Here, the code 120 is a quick response (QR) code or two-dimensional barcode. The QR code can include the location of the resource to display, alone or in combination with other information or executable code.

Disclosed embodiments may include an augmented reality device, such as the augmented reality glasses 140. Augmented reality glasses 140 may sometimes be referred to as smart glasses or an augmented reality headset and may include head-wearable lenses that enhance reality by projecting content onto the lenses for a more immersive experience. Augmented reality glasses 140 may superimpose content onto the real-world environment, such as images, video, and text. The augmented reality glasses 140 are operable to acquire information resources and project the resources into the extended view 150, which may correspond to an area outside the purview of the web browser 120 and the physical dimensions of the display 112.

The augmented reality glasses 140 can receive a request for display and a network-accessible location where the information resources or content are stored. In one embodiment, the request and network-accessible location can be transmitted and acquired through wireless communication. For instance, short-range wireless communication systems such as Bluetooth Wi-Fi, ZigBee, Ultra-wideband (UWB), and infrared (IR) can be utilized by the computing device 110 and the augmented reality glasses 140. In an alternate embodiment, the augmented reality glasses can include a camera that can detect and read the code 122 displayed by the web browser 120 or a web page presented by the web browser 120. The code 122 can be a mechanism for representing a network address in a visual and machine-readable form. For example, the code 122 can correspond to a one-dimensional or two-dimensional barcode. After the location or address is acquired, the augmented reality glasses 140 can acquire information resources or content from a network-accessible server and present such content in the extended virtual reality view overlaid on the web browser. In one instance, the augmented reality glasses can also be extended to support the extended view 150. For example, an application, applet, plugin, extension, or the like can be acquired and installed on augmented reality glasses.

The network 160 can correspond to a local area network (LAN) or wide area network (WAN), among others. In accordance with an embodiment, the network 160 can correspond to the Internet or a global system of interconnected computer networks and devices that uses the Internet protocol (TCP/IP) to communicate. The Internet can support inter-linked hypertext documents and services on the web, among other things.

The server(s) 170 correspond to hardware, software, or both that provide functionality or services to multiple clients in a client-server architecture. Under one embodiment, the servers 170 can be web servers that accept and respond to requests for a web page or other resource. However, the servers 170 or a subset thereof can also correspond to database, file, or application servers, among others. The computing device 110 and augmented reality glasses 140 can access one or more of the servers 170 through network 160.

The augmented reality glasses 140, in conjunction with the computing device 110, can be employed in various contexts to render content in the real world outside the physical dimensions of a display device. In one example, the augmented reality glasses 140 can project web page content that is above the fold on top of the browser and content that is below the fold below the browser. Above the fold refers to web page content only visible with a scroll-up action. Similarly, below the fold concerns web page content displayed solely after a scroll-down action. Employment of an extended augmented reality view expands the amount of content that can be viewed at one time. In a second example, the augmented reality glasses 140 can interact with an online shopping browser extension and project an animation or video of falling coins 152 when savings are found or a promotional code used during a purchase, for instance. Here, user experience is enhanced by using the extended view 150. In a third example, the augmented reality glasses 140 can interact with a browser extension that generates a virtual payment card. In this instance, an image of a payment card 154, together with pertinent information such as account number, expiration date, and security code, can be projected in the extended view. In this manner, the payment information is available for use on different web pages and across browser windows and tabs. This significantly improves user experience over confining payment information to a separate window or tab. In another instance, objects can be projected within a physical space surrounding the user, such as projecting a couch within a living room or displaying a virtual card on a table.

Figure 2:
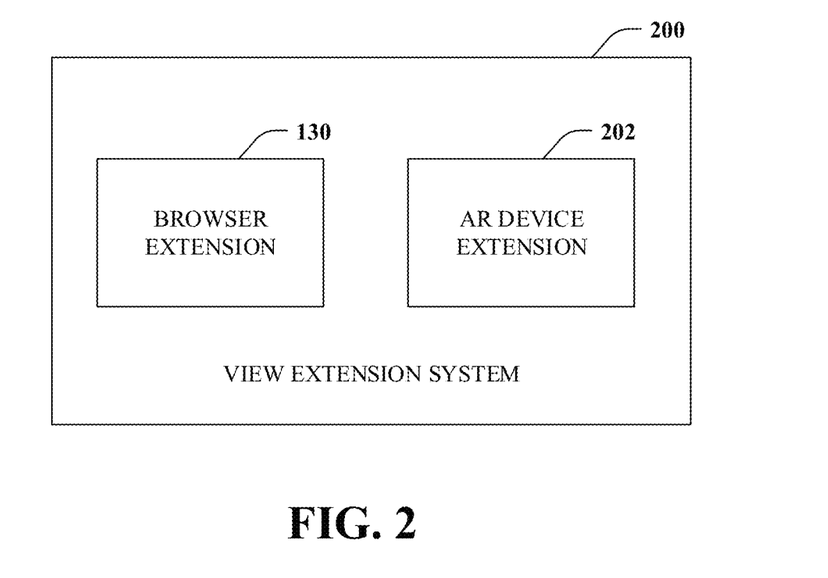
FIG. 2 is a block diagram of an example view extension system.

FIG. 2 is a block diagram of a view extension system 200 in accordance with an aspect of this disclosure. The view extension system 200 may include a view browser extension 130 and augmented reality (AR) device extension 202. The browser extension 130 and the AR device extension 202 can be components or sub-systems, as used herein. The browser extension 130 and the AR device extension can be implemented by a processor coupled to a memory that stores instructions that, when executed, cause the processor to perform the functionality of each extension. The browser extension 130 expands the functionality of a web browser executing on a computing device to support an extended view. The AR device extension 202 expands the functionality of an augmented reality device such as augmented reality glasses to support extended view functionality and interaction with the browser extension 130. However, the browser extension 130 can achieve the desired functionality in one embodiment by invoking an exposed application programming interface (API) with or without the AR device extension 202. Further example details regarding the browser extension 130 and the AR device extension are provided below with respect to FIGS. 3 and 4.

Figure 3:
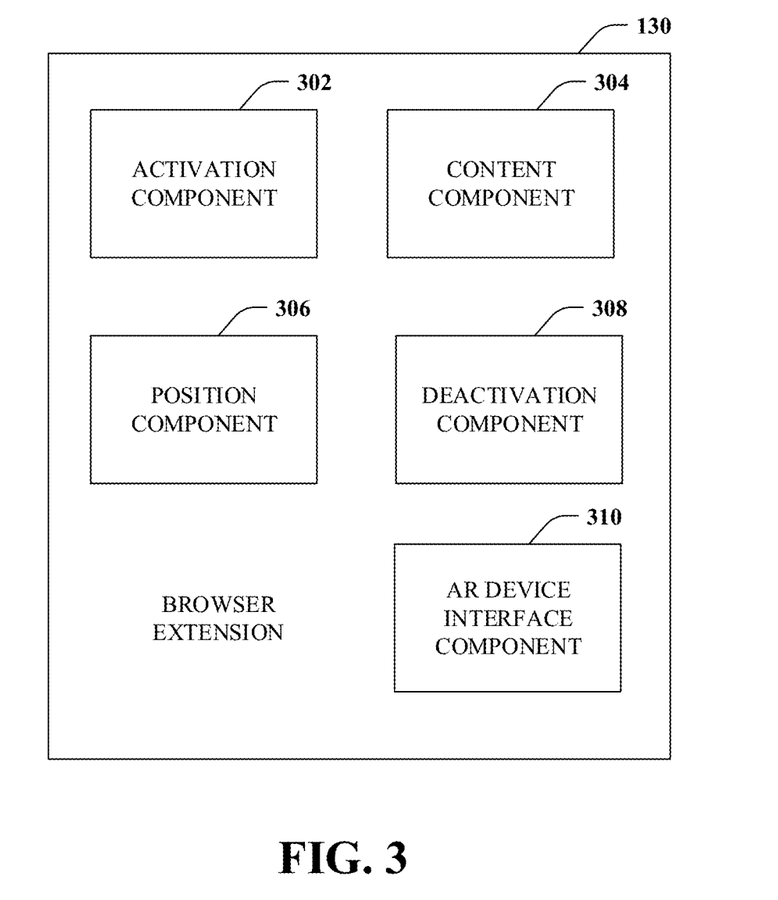
FIG. 3 is a block diagram of an example browser extension.

FIG. 3 is a block diagram depicting an example browser extension 130. The browser extension 130 may include activation component 302, content component 304, position component 306, deactivation component 308, and augmented reality (AR) device interface component 310. The activation component 302, content component 304, position component 306, deactivation component 308, and AR device interface component 310 can be implemented by a processor coupled to a memory that stores instructions that cause the processor to perform the functionality of each component when executed. Consequently, a computing device can be configured to be a special-purpose device or appliance that implements the functionality of the view extension system 130. The browser extension 130 can be embodied as a standalone browser extension executed by a web browser or integrated within another browser extension (e.g., virtual payment card, online shopping). Further, the functionality of the browser extension 130 can be embedded within the browser as native functionality or a computing device application or portion of an application, among other things.

The activation component 302 is operable to request presentation by an augmented reality device such as smart glasses. Wireless communication can be established between a computing device and the augmented reality device in one embodiment. For instance, short-range wireless communication systems such as Bluetooth Wi-Fi, Zig-Bee, Ultra-wideband (UWB), and infrared (IR) can be utilized. The request can then be sent through the wireless communication medium. In an alternate embodiment, the activation component 302 can generate a visual and computer-readable code and display the code in a browser, such as on a web page. The code can correspond to a one-dimensional or two-dimensional barcode that can be captured and read by an augmented reality device. The presence of the code can comprise a request for presentation.

The content component 304 is operable to store content at a location on a network-accessible data store or server. The content can include a web page, text, image, video, programmatic code, or a combination thereof. The location can be an internet protocol (IP), uniform resource locator (URL), or a web address in an embodiment where the content is stored on a web server. This location or address can be provided by the activation component 302 through wireless communication. Alternatively, the activation component 302 can encode the location or address within the visual code.

The position component 306 may be operable to specify a location within an extended view where the content is to be displayed. For example, if the content corresponds to web page content above the fold, the position would likely be specified in a top portion of the extended view. By contrast, if the content corresponds to web page content below the fold, the position would be the bottom portion of the extended view. A virtual card could be positioned in a corner while coins can rain down from the top to indicate savings. Further, content can be anchored to a specific location or specified with a relative or movable position. The position information, or location within an extended view, can be specified separately from the content or with the content.

The deactivation component 308 is configured to terminate the extended view or presentation of content within the extended view. The deactivation component 308 can communicate with an augmented reality device and request termination of the presentation of all or a portion of the displayed content. Alternatively, a flag can be set to indicate whether or not to terminate the presentation. The flag can be set or unset, and an action can be associated with each state. For example, the setting of the flag can indicate that the presentation of content should be terminated, while an unset flag can denote continued presentation or vice versa. An augmented reality device can poll the flag to determine whether to present or terminate content presentation. The presentation can be discontinued for several reasons. First, the presentation can be terminated after a predetermined time or after playing a video a set number of times. Second, the presentation can be terminated by closing a web browser or browser tab. Further, a mechanism can be provided to a user to terminate the presentation of content, among other things.

The augmented reality (AR) device interface component 310 may enable communication and interaction with augmented reality devices, such as glasses. In one instance, the interface component 310 can enable the use of an application programming interface (API) associated with an augmented reality device. An augmented reality device can expose a set of operations that can be invoked from the browser extension 130 and, more particularly, augmented reality device interface component 310. Other embodiments are also possible to enable communication between a browser and augmented reality device.

Figure 4:
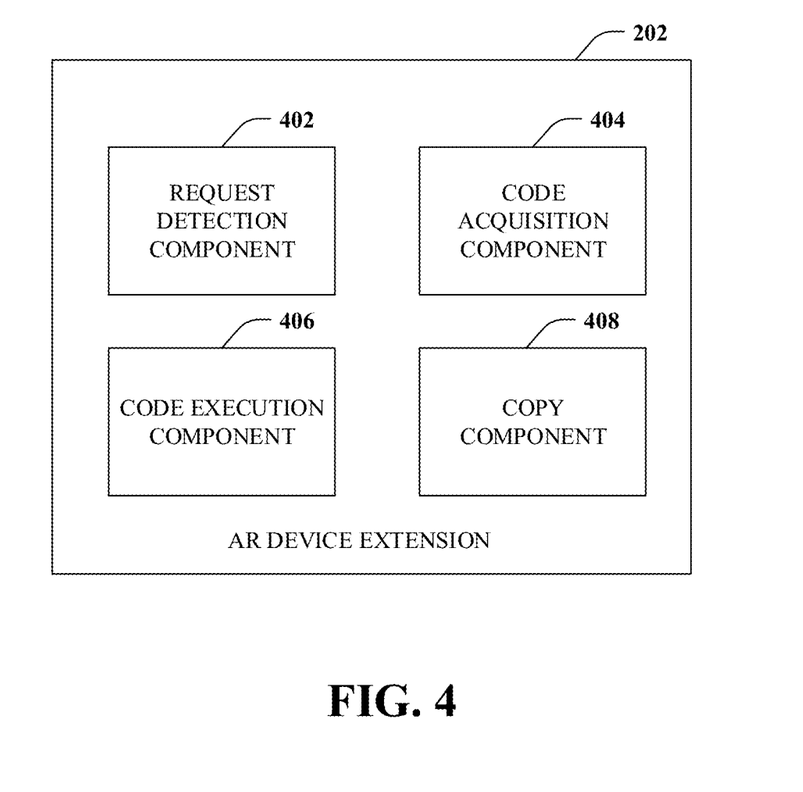
FIG. 4 is a block diagram of an example augmented reality device extension.

FIG. 4 is a block diagram of an example augmented reality (AR) device extension 202 to support view extension on an augmented reality device. The AR device extension 202 can extend or upgrade the native functionality of an augmented reality device, such as augmented reality glasses, to provide for view extension functionality. The AR device extension 202 comprises request detection component 402, code acquisition component 404, code execution component 406, and copy component 408. The components can be implemented by a processor coupled to a memory that includes instructions that, when executed by the processor, cause the processor to implement the functionality of each component and the AR device extension 202.

The request detection component 402 is operable to detect a request for content presentation in an extended view. The request can be detected based on direct communication over a wireless network in one instance. For example, an AR device can be communicatively paired with a computing device to permit interaction and data exchange. In this scenario, the request detection component 402 can monitor and analyze communications from a computing device for a presentation request or the like.

The request detection component 402 is also operable to detect a visual code displayed by a browser or web page as the request. For example, images of the browser display can be captured by a camera associated with an augmented reality device and analyzed to detect the presence or absence of a visual code to determine whether or not a request is detected. For instance, the request detection component 402 can detect a barcode displayed by a web browser. In addition to the request, or as part of the request, a uniform resource locator, web address, or other network location can be specified. For instance, the visual code can encode a web address.

The code acquisition component 404 is operable to acquire code or other content from a network location. The code acquisition component 404 can acquire a location of a network-accessible store or server from or in conjunction with the request. In one instance, provisioning a network address itself or a representation of the network address corresponds to a presentation request. The code acquisition component 404 can acquire or extract the network address from a visual representation. Subsequently, the code acquisition component 404 can navigate to the network location and receive code, content, or the like. The code can include functionality or content associated with an extended view.

The code execution component 406 can receive code acquired by the code acquisition component 404 and trigger execution. According to one aspect, the code can correspond to content to be projected at a particular location associated with a browser and computing device display. Execution can correspond to invoking one or more augmented reality device functions or procedures to cause the content to be presented. As per another aspect, code can pertain to web page content for presentation above or below the browser or computing device display. In this situation, a camera can track, or a browser can identify, portions of content currently being displayed. Based on this input, code execution can determine the portions of content that are above and below the fold and initiate presenting of that content in the appropriate locations. The code execution component 406 can also query a flag to determine whether content presentation should continue or be terminated. The code execution component 406 enables simple and highly complex presentation logic to be specified and performed by an augmented reality device.

The copy component 408 is operable to enable the copying of content displayed in an augmented reality extended view. Mechanisms such as physical buttons or gestures can be provided to enable the selection and copying of content displayed in augmented reality. For example, a user can gaze in the direction of content, tap once at a location on the user's augmented reality glasses to select the content, and tap the location again to copy the content. The content can then be communicated to a web browser executing a separate computing device and saved to the clipboard for subsequent pasting. Per one embodiment, a network-accessible clipboard can be employed such that content can be saved to it and accessed as part of a paste operation, for instance.

By way of example, and not limitation, disclosed embodiments may address a situation in which a virtual payment card is presented in the top left corner of an extended view, and payment information is solicited for an online purchase through the user's web browser. In this instance, the computer system may include sensors that detect a gaze of the user in the direction of a graphic of a payment card including overlaid payment information, and include hardware (e.g., a button, touchscreen) to receive a user command to copy the payment information. For example, the computing system may include a sensor that detects a users' tap at a location on the user's augmented reality glasses and use that to trigger to copy the payment information. The augmented reality device can send the payment information to the browser by way of wireless communication technology, and the computing system operating the browser can save the payment information to a local clipboard. Alternatively, or additionally, the augmented reality device can save the payment information to a network-accessible clipboard that can be accessed by the computing device that displays the browser. The computing device may then receive as input a user command to paste the information into the browser to satisfy the request for such information.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed, thereby making portions of the systems and methods more adaptive as well as efficient and intelligent. By way of example, and not limitation, the view extension system 200 can employ such mechanisms for at least image analysis with respect to identifying a displayed code and extracting a network location. Additionally, such mechanisms can be employed to provide computer vision and analysis to detect a browser and enable the extended view to be appropriately positioned surrounding the browser.

Figure 5:
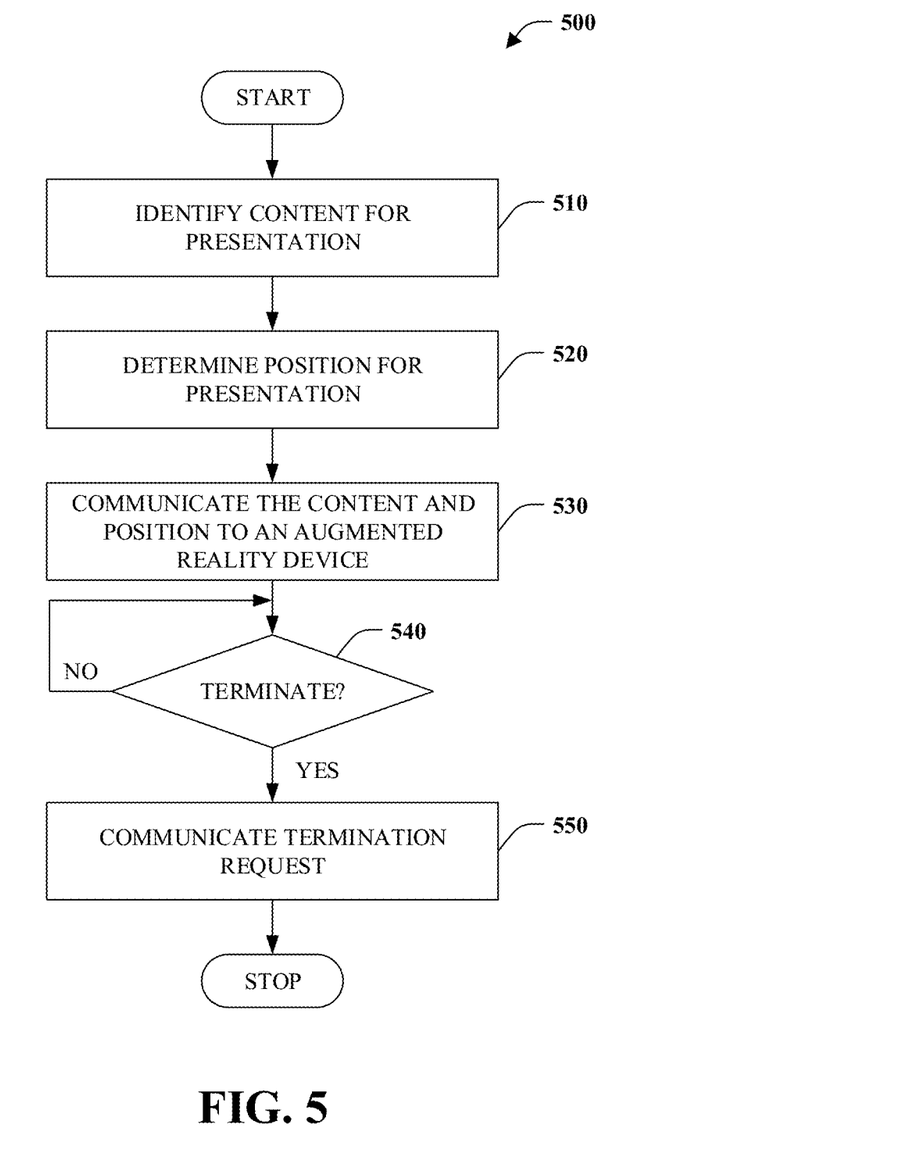
FIG. 5 is a flow chart diagram of a method of presenting an extended view
Figure 6:
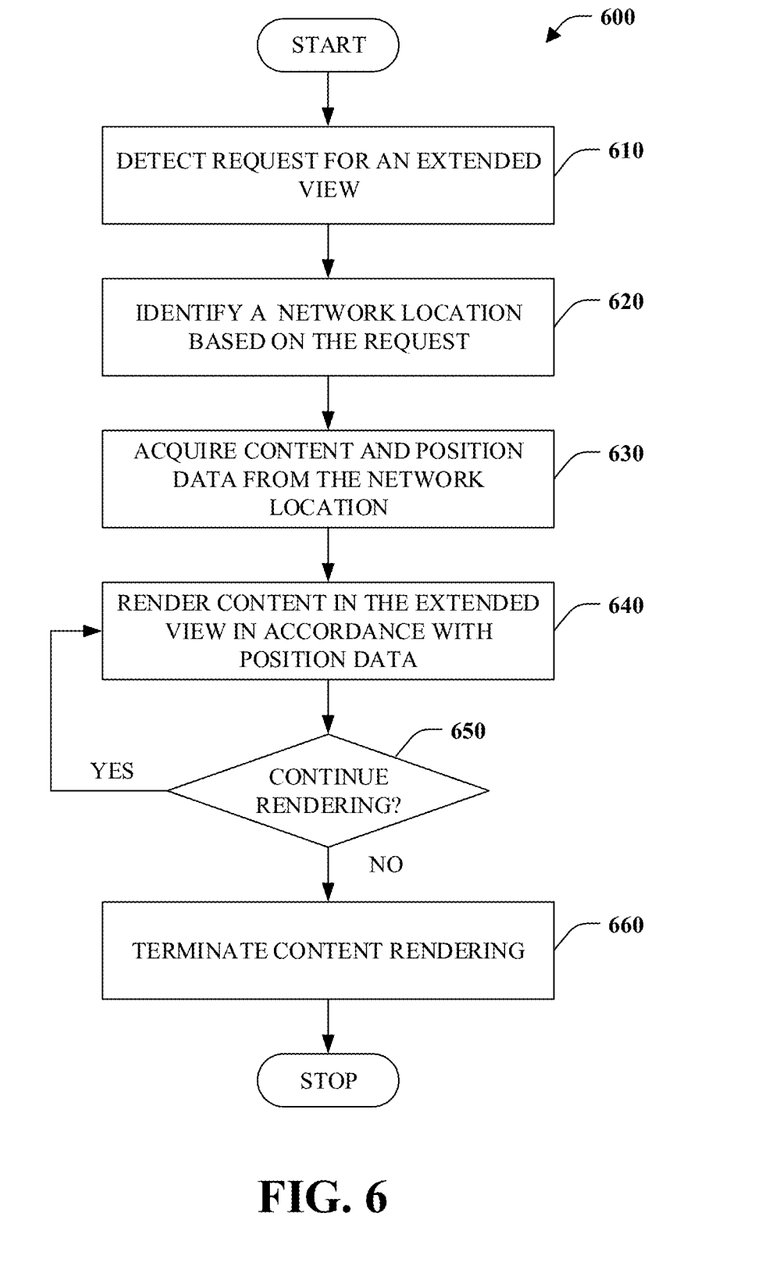
FIG. 6 is a flow chart diagram of an augmented reality presentation method.
Figure 7:
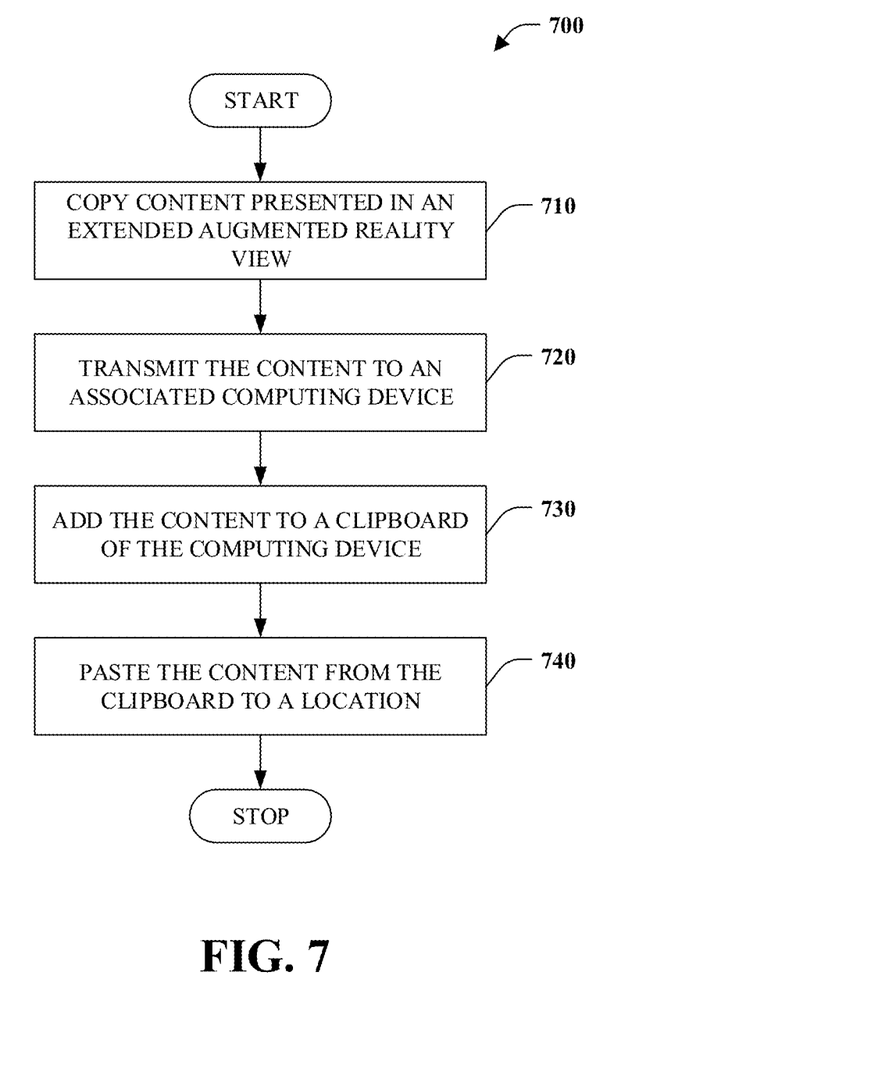
FIG. 7 is a flow chart diagram of a method of content copying from an extended view.

In view of the example systems described above, methods that may be implemented in accordance with the disclosed subject matter will be better appreciated with reference to flow chart diagrams of FIGS. 5-7. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 5, a method of presenting an extended view 500 is illustrated. The method 500 can be implemented and executed by the view extension system 200 and, more particularly, the browser extension 130.

At step 510, the method 500 may identify content to present of substantially any type. For example, the content can include a web page or portion thereof, an image, a video, an animation, programmatic code, or a combination. The content can be associated with a web page or other browser extension (e.g., online shopping, virtual payment number . . . ).

At step 520, the method 500 may determine a presentation position. The position pertains to the location within an extended view at which the content will be projected. For example, the position can be above or below a browser, top left corner, or bottom right corner, among others. In one instance, the position can be anchored such that content will not move relative to the browser and display. Alternatively, the position can be relative and moveable with a user's gaze. For example, if the content is a piece of furniture, a rendering can move with a user's gaze to allow the user to picture how the piece of furniture would look and fit within a room.

At step 530, the method 500 may communicate the content and position to an augmented reality device. The content can be communicated wirelessly to augmented reality glasses in one embodiment. For example, augmented reality glasses (e.g., augmented reality glasses 140) can be wirelessly paired with a computing device exposing the browser. Alternatively, code can be displayed by a web browser on a web page that encodes the content and position or a network location where the content and position are saved. For example, the code can correspond to a two-dimensional barcode that specifies a web address (e.g., IP address, URL, . . . ) that includes the content and position data.

At step 540, the method 500 may determine whether or not to terminate presenting the content. In one instance, content can be presented for solely a predetermined time. Further, content presentation can be terminated after closing a web browser or particular tab associated with the content. Furthermore, a user can specify that the presentation of content be terminated. If content presentation should not be terminated ("NO"), the method 500 can loop back to step 540 to check again. If content presentation should be terminated ("YES"), the method 500 continues at step 550.

At step 550, the method 500 may send a termination request to terminate presenting to an augmented reality device. The termination request can be sent directly to the augmented reality device by way of established wireless communication. Alternatively, a flag can be set or unset at a network location, indicating that content presentation should be terminated. The augmented reality device can regularly or periodically check the flag to determine whether to continue or terminate content presentation.

FIG. 6 is a flow chart diagram of an augmented reality presentation method 600. The method 600 can be executed by the augmented reality device extension 202 as part of the view extension system 200.

At step 610, the method 600 may detect a request for extending the view. The request can be detected by analyzing wireless communications for the request. Alternatively, a camera can capture images of web browser displays, and the images can be analyzed for the presence of a visual code indicative of the request. For example, the visual code can be a barcode or the like.

At step 620, the method 600 may identify a network location based on the request. In one instance, the request can be communicated wirelessly in conjunction with a network location that can be identified. In an instance in which a visual code is employed, the network location can be extracted from the visual code. For example, a two-dimensional barcode or QR code can encode a network location that can be read.

At step 620, the method 600 may acquire content and position data, among other things, from the identified network location. The network location can correspond to a network-accessible database or server. The content can correspond to a web page, image, video, animation, programmatic code, or a combination thereof. Position data can also be specified for the content. For example, the position data can specify a location within an extended view where the content is to be displayed.

At step 630, the method 600 may render the content in an extended view at the position. In one instance, rendering can correspond to projecting the content on one or more lenses of augmented reality glasses. The extended view can circumscribe a browser and display rendering browser content. A user can view the browser as it is displayed. However, the view surface is extended beyond the purview of the browser and display device with augmented reality glasses. In this manner, invisible content that requires scrolling in a browser to become visible (e.g., above the fold, below the fold) can now become visible in an extended virtual reality view. Further, information conventionally confined to a browser tab can be rendered outside the tab in the extended view for use with all tabs or outside the browser. For example, virtual credit card information can be rendered in augmented reality and used to enter the information in different tabs or outside of a computing environment.

At step 650, the method 500 may determine whether to terminate rendering the content. Rendering can be terminated for several reasons. For instance, content can be designated for display for solely a predetermined time. Content can also be terminated when a browser or browser tab is closed, or a user requests content presentation termination. A termination request can be sent to and received by an augmented reality device wirelessly. Alternatively, a flag or the like can be set or unset at a network location, which the augmented reality device can poll. If the rendering is to continue ("YES"), the method 600 returns to step 640. If the rendering is not to continue ("NO"), the method continues at step 660, where the augmented reality device ceases or terminates the rendering of the content.

FIG. 7 is a flow chart diagram of a method 700 of content copying from an extended view. The method 700 can be implemented and executed as part of the view extension system 200.

At step 710, the method 700 may copy content presented in an extended augmented reality view. In one instance, a user can gaze at content displayed in virtual reality and then perform an action to trigger copying. For example, the user can press a physical or virtual button or tap a number of times at a location on a pair of augmented reality glasses. The content can include an image or graphic or information associated therewith. For instance, the content can include an image of a credit card with credit card information overlaid on top of the image. In this case, the image, the credit card information, or both can be copied.

At step 720, the method 700 may transmit copied content to a user computing device. The content can be sent directly to the computing device through established wireless communication. Alternatively, the content can be sent and saved to a network-accessible location.

At step 720, the method 700 may add the copied content to a computing device clipboard. The computing device can receive the content by way of wireless communication. Alternatively, the content can be received or retrieved from a network-accessible data store or server. Once acquired, the content can be saved to the local clipboard.

At step 740, the method 700 may paste content from the clipboard to a location. For example, credit card information previously presented in an extended augmented reality view and subsequently copied and saved to the clipboard can be utilized to complete payment fields on a web page.

This disclosure pertains to the technical problem of web browsers and limited display capabilities. More specifically, web browsers are confined to presenting content within the physical bounds of a display device. The technical solution comprises extending the view by way of augmented reality glasses. A web browser, through a browser extension, can communicate a request to present content in an extended augmented reality view. As part of or separate from the request, content and positioning information, among other things, can be provided or otherwise made available to augmented reality glasses. After receipt, the augmented reality glasses can project the content on one or more lenses above, below, or on the sides of a browser or display device. A user can subsequently view the browser content and content presented in the extended view.

Aspects of the subject disclosure have been described extensively with respect to a web browser. However, the aspects are not limited to employment with respect to a browser. Instead, the aspects can be utilized with substantially any application on any device. For example, display of an application executing on a smartphone or watch can be extended beyond the physical dimensions of those devices with an augmented reality device.

Further, a display can be extended by an augmented reality device beyond a predetermined distance surrounding a display device. In one instance, the display can be extended to a predetermined distance surrounding the user. A user's current position can be determined or inferred based on various technologies alone or in combination, including global satellite positioning (GPS), wireless location beacons or tags, and computer-vision-based object detection. In this manner, content can be rendered in a physical location surrounding a user, such as in the living room. For example, a safe could be rendered in the living room or bags of money displayed on a couch in the living room.

As used herein, the terms "component" and "system," as well as various forms thereof (e.g., components, systems, sub-systems), are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the terms "infer" and "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

Figure 8:
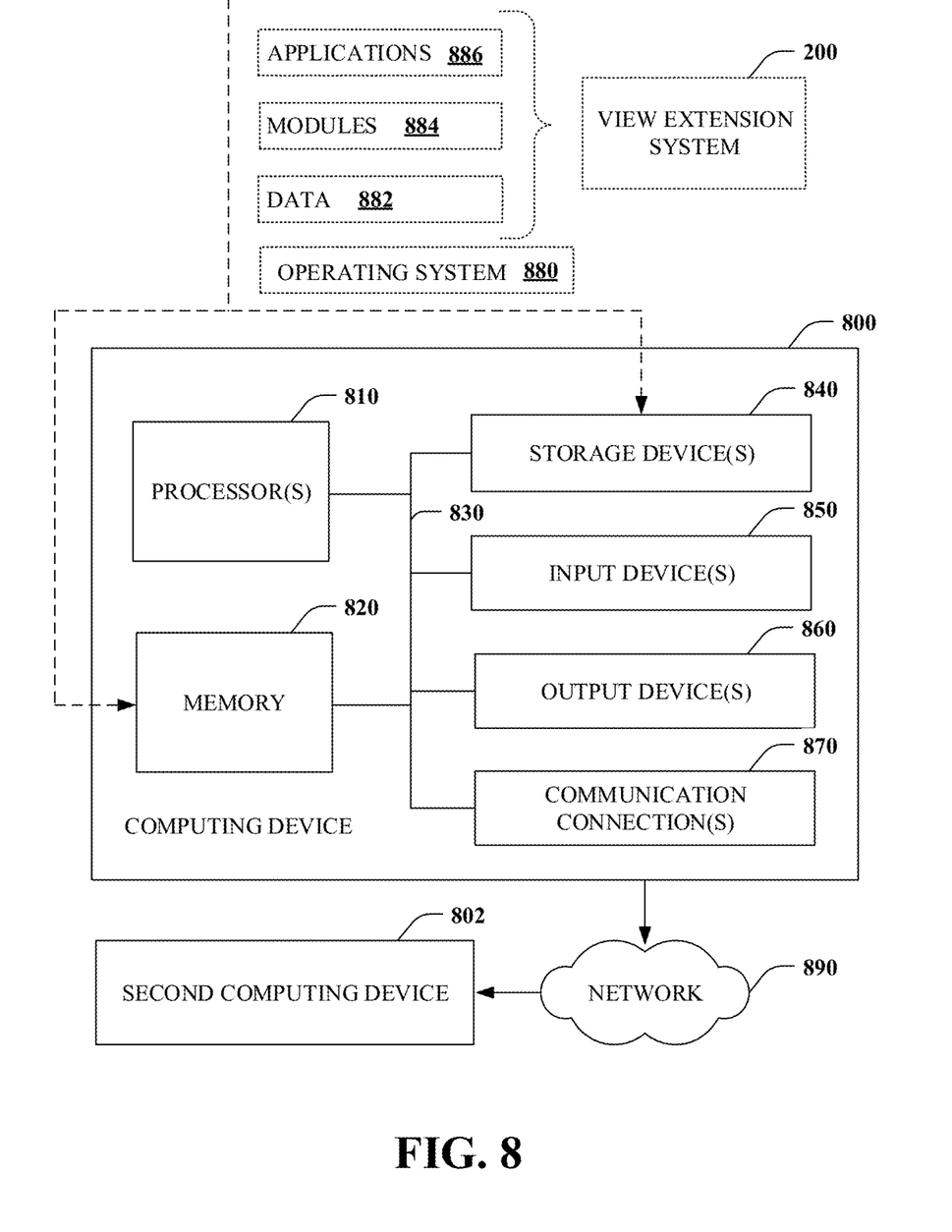
FIG. 8 is a block diagram illustrating a suitable operating environment for aspects of the subject disclosure.

To provide a context for the disclosed subject matter, FIG. 8, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, which perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on standalone computers. In a distributed computing environment, program modules may be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive)), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 may be volatile (e.g., random access memory (RAM)), non-volatile (e.g., read-only memory (ROM), flash memory), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include or have stored therein operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming and/or engineering techniques to produce software, firmware, hardware, or any combination thereof to control the computing device 800 to realize the disclosed functionality. By way of example and not limitation, all or portions of the view extension system 200 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the view extension system 200 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth), or a combination thereof The computing device 800 can also include communication connection(s) 870 to enable communication with at least a second computing device 802 utilizing a network 890. The communication connection(s) 870 can include wired or wireless communication mechanisms to support network communication. The network 890 can correspond to a personal area network (PAN), local area network (LAN), or a wide area network (WAN) such as the Internet. In one instance, the computing device 800 can correspond to a user's desktop, laptop, or tablet computer with a web browser that is extended by a browser extension provided by the view extension system 200. The second computing device can correspond to augmented reality glasses. The computing device 800 can communicate content over the network 890 for presentation by the augmented reality glasses in an extended view associated with the browser. In another instance, the computing device 800 can correspond to a user computing device or augmented reality device, and the second computing device can be a data store or server accessible over the network 890.

What has been described above includes examples of aspects of the claimed subject matter. It is, of course, not possible to describe every conceivable combination of components or methods to describe the claimed subject matter. However, one may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for extending a view of web content with augmented reality, comprising:
   one or more processors;

one or more non-transitory computer-readable media having instructions that, when executed by the one or more processors, cause the one or more processors to:
identify content associated with a webpage being displayed on a web browser for presentation outside a purview of the web browser;
determine, based on the webpage being displayed on the web browser, whether the content corresponds to web page content above a fold on top of the web browser or web page content below the fold below the web browser, wherein web page content above the fold includes web page content only visible with a scroll-up action, wherein web page content below the fold includes web page content only visible with a scroll-down action;
in response to determining that the content corresponds to web page content above the fold, determine position information for the content in a top portion of an extended view overlaid on the web browser;
in response to determining that the content corresponds to web page content below the fold, determine the position information for the content in a bottom portion of an extended view overlaid on the web browser;
generate an instruction to save the content to network-accessible storage; and
generate a request, including a location of the network-accessible storage and the position information for the content, to an augmented reality device to present the content in the extended view overlaid on the web browser.

2. The system of claim 1, wherein the instructions further cause the one or more processors to identify content associated with a web browser extension that generates a virtual payment card.

3. The system of claim 1, wherein the instructions further cause the one or more processors to identify content related to a web browser extension that identifies a deal on a product or service during online shopping.

4. The system of claim 1, wherein the instructions further cause the one or more processors to generate a visible code and display the visible code on a webpage of the web browser to send the request.

5. The system of claim 1, wherein the instructions further cause the one or more processors to initiate wireless communication with the augmented reality device.

6. The system of claim 1, wherein the instructions further cause the one or more processors to set a flag to continue presentation of the content in the extended view.

7. The system of claim 1, wherein the instructions further the one or more processors to set a flag to discontinue presentation of the content in the extended view.

8. The system of claim 1, wherein the instructions further the one or more processors to:
detect closing of the web browser; and
set a flag to discontinue presentation of the content in the extended view.

9. The system of claim 1, wherein the instructions further cause the one or more processors to:
acquire data copied from the extended view; and
save the data to a clipboard to enable the data to be pasted on a web page in the web browser.

10. The system of claim 1, wherein the instructions further cause the one or more processors to save a display position of the content in the extended view at the location.

11. The system of claim 8, wherein the content includes persistent content, wherein discontinuing presentation of the content in the extended view excludes discontinuing presentation of the persistent content.

12. The system of claim 4, wherein generating the visible code comprising generating a quick response code (QR code), wherein the QR code corresponds to a location to retrieve the content for presentation in the extended view.

13. A method of extending a view of web content, comprising:
identifying content associated with a webpage being displayed on a web browser for presentation outside a purview of a web browser;
determining, based on the webpage being displayed on the web browser, whether the content corresponds to web page content above a fold on top of the web browser or web page content below the fold below the web browser, wherein web page content above the fold includes web page content only visible with a scroll-up action, wherein web page content below the fold includes web page content only visible with a scroll-down action;
in response to determining that the content corresponds to web page content above the fold, determining position information for the content in a top portion of an extended view overlaid on the web browser;
in response to determining that the content corresponds to web page content below the fold, determining the position information for the content in a bottom portion of an extended view overlaid on the web browser;
generating an instruction to save the content to a network-accessible data store; and
generating a request, including a location of the network-accessible data store and the position information for the content, to an augmented reality device to present the content in the extended view overlaid on the web browser.

14. The method of claim 13, further comprising identifying non-displayed web page content for presentation outside the purview of the web browser.

15. The method of claim 13, further comprising identifying web page content generated by a web browser extension that generates a virtual payment card.

16. The method of claim 13, further comprising identifying web page content generated by an online shopping browser extension.

17. The method of claim 13, further comprising setting a flag to discontinue presentation of the content in the extended view.

18. The method of claim 13, further comprising generating and displaying a visible code on a web page of the web browser to send the request.

* * * * *